C. M. LUFKIN.
Swivel-Plow.

No. 209,697.                Patented Nov. 5, 1878.

Attest.
Mattie E. Lufkin
Emma P. Burge.

Inventor.
Charles M. Lufkin.

UNITED STATES PATENT OFFICE.

CHARLES M. LUFKIN, OF ALSTEAD, NEW HAMPSHIRE.

IMPROVEMENT IN SWIVEL-PLOWS.

Specification forming part of Letters Patent No. 209,697, dated November 5, 1878; application filed October 28, 1878.

*To all whom it may concern:*

Be it known that I, CHARLES M. LUFKIN, of Alstead, in the county of Cheshire and State of New Hampshire, have invented a new and useful Improvement in Swivel-Plows, which improvement is fully set forth in the following specification, reference being had to the accompanying drawings.

The object of my invention is to obtain a more perfect cutting device to form the furrow-slice than that in common use, and is accomplished by a self-adjusting colter and a land-wing, which is attached to both sides of the rear end of the bottom of the standard, for the purpose of cutting under the land, so that the furrow-slice may be completely cut off, thereby greatly facilitating the operation of turning the furrow-slice and materially lessening the draft.

Figure 1:
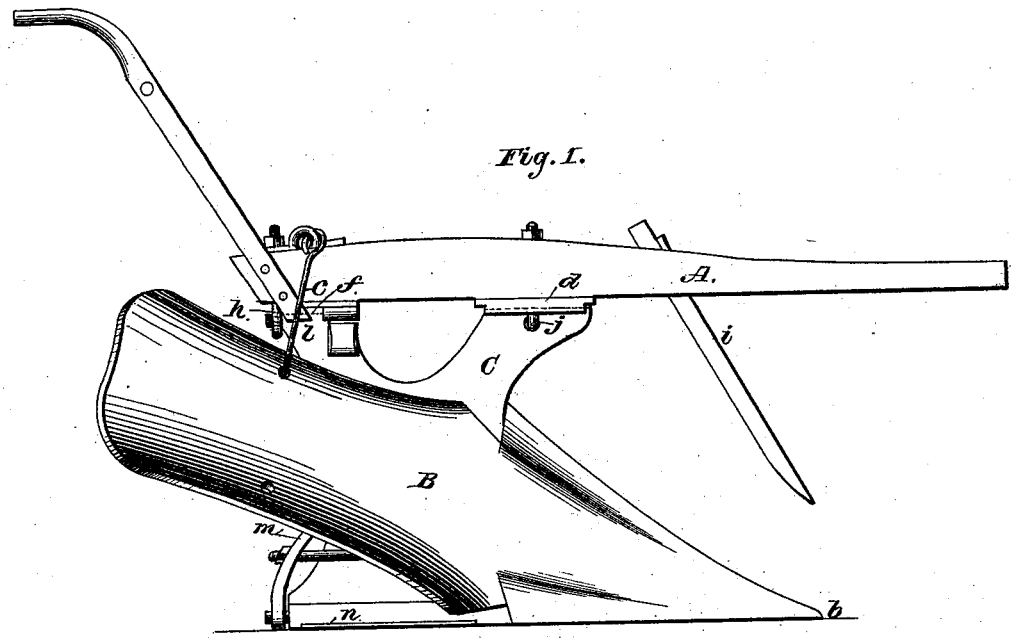
Figure 2:
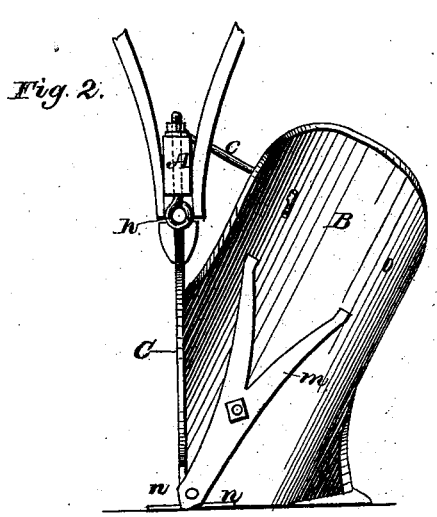
Figure 3:
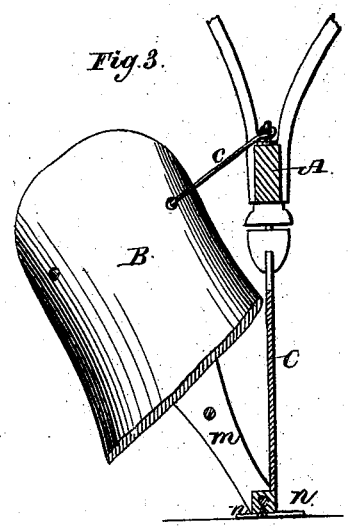

The colter $i$ is attached firmly to the beam A in any convenient manner, and the beam is attached to the standard C by a joint or hinge, which is so constructed as to admit of sufficient movement to adjust the colter $i$ into proper position with the point $b$, and is firmly held by the hook $c$ in the usual manner, as shown in the side view, Figure 1, in the rear view, Fig. 2, and in section, Fig. 3.

The mold-board B is pivoted to the front end of the land-side or standard C, and the inner side of the mold-board has a V-shaped brace, $m$, which is pivoted to the back end of the land-side.

By this arrangement the mold-board B may be turned around underneath the standard, so as to be adjusted to either side of the beam, as may be required.

To the under side of the beam A are attached two sockets, $d$ and $f$, which are fitted to the top of the standard and attached by means of a hook-shaped bolt, $h$, and eyebolt $j$, forming a jointed or hinged connection of the beam to the standard, by which the beam is held in position and allowed to rock from right to left by reversing the plow for the purpose of adjusting the colter $i$ to the point $b$, and it is retained in position by the hook $c$, which firmly holds the guide-socket $f$ on its bearing $l$, thereby holding the several parts in proper position. To the rear end of the standard or land-side, at the bottom, are attached two wings or angular cutters, $n$ $n$, projecting laterally on both sides, and so constructed that they may be detached when worn out and replaced with new ones.

When the plow is drawn along the colter $i$ cuts down through the turf nearly perpendicularly, gaging the width of the furrow-slice, and the wing $n$, which is on the land-side of the plow, cuts under the land, so that in cutting the next furrow the share will meet its track, cutting the furrow-slice completely off, enabling the plow to cut a much wider and deeper furrow than it would otherwise do.

I do not claim a self-shifting colter, as that is an old and well-known device; but I do claim as my invention and desire to secure by Letters Patent—

The rocking beam A, carrying the colter $i$, in combination with the standard C, hinged to said beam, as described, the colter being shifted into line with the point $b$ by means of the rocking beam, all constructed and arranged to operate substantially as set forth.

CHARLES M. LUFKIN.

Witnesses:
MATTIE E. LUFKIN,
EMMA P. BURGE.